US012609744B2

(12) United States Patent
Axmon et al.

(10) Patent No.: US 12,609,744 B2
(45) Date of Patent: Apr. 21, 2026

(54) METHOD FOR A MULTI-ANTENNA TRANSMITTER AND RECEIVER ARRANGEMENT, A COMPUTER PROGRAM PRODUCT, A MULTI-ANTENNA TRANSMITTER AND RECEIVER ARRANGEMENT, A WIRELESS DEVICE, AND A TRANSCEIVER NODE

(71) Applicant: BEAMMWAVE AB, Lund (SE)

(72) Inventors: Joakim Axmon, Limhamn (SE); Bengt Lindoff, Bjärred (SE)

(73) Assignee: BEAMMWAVE AB, Lund (SE)

( * ) Notice: Subject to any disclaimer, the term of this patent is extended or adjusted under 35 U.S.C. 154(b) by 47 days.

(21) Appl. No.: 18/852,354

(22) PCT Filed: Apr. 6, 2023

(86) PCT No.: PCT/SE2023/050321
§ 371 (c)(1),
(2) Date: Sep. 27, 2024

(87) PCT Pub. No.: WO2023/204743
PCT Pub. Date: Oct. 26, 2023

(65) Prior Publication Data
US 2025/0183959 A1 Jun. 5, 2025

(30) Foreign Application Priority Data
Apr. 19, 2022 (SE) .................................... 2230114-7

(51) Int. Cl.
*H04B 7/06* (2006.01)
(52) U.S. Cl.
CPC .................................. *H04B 7/0617* (2013.01)
(58) Field of Classification Search
CPC .................................................... H04B 7/0617
See application file for complete search history.

(56) References Cited

U.S. PATENT DOCUMENTS 7,369,877 B2 * 5/2008 Reilly .................. H04B 7/0822
455/562.1
8,599,980 B2 * 12/2013 Ko ........................ H04B 7/0417
342/368
(Continued)

FOREIGN PATENT DOCUMENTS

EP          1152549 A1    11/2001
EP          2088726 A1     8/2009
(Continued)

OTHER PUBLICATIONS

International Search Report and Written Opinion for International Application No. PCT/SE2023/050321, filed Jun. 27, 2023.
(Continued)

*Primary Examiner* — Dac V Ha
(74) *Attorney, Agent, or Firm* — MARSHALL, GERSTEIN & BORUN LLP

(57) ABSTRACT

A method for a multi-antenna transmitter and receiver arrangement, the multi-antenna transmitter and receiver arrangement being comprisable in a wireless device, WD or in a transceiver node, TNode, the method comprising: obtaining a first plurality of arrays, each array comprising digital signals, each digital signal comprising information; performing first beamforming processing on the first plurality of arrays to obtain a second plurality of processed digital signals; performing second beamforming processing in a time domain on the second plurality of processed digital signals to obtain a third plurality of digital signals; combining the third plurality of digital signals to obtain a third plurality of combined digital signals; converting each of the third plurality of combined digital signals to respective analog signals; and transmitting each of the analog signals. Corresponding computer program product, multi-antenna
(Continued)

transmitter and receiver arrangement, wireless device, and transceiver node are also disclosed.

18 Claims, 6 Drawing Sheets

(56)     References Cited

U.S. PATENT DOCUMENTS

| | | | |
|---|---|---|---|
| 8,842,655 B2 * | 9/2014 | Mochida | .............. H04B 7/0868 |
| | | | 375/267 |
| 2009/0046768 A1 | 2/2009 | Pare, Jr. | |
| 2009/0161739 A1 | 6/2009 | Kim et al. | |
| 2015/0124688 A1 | 5/2015 | Xu et al. | |
| 2018/0227028 A1 | 8/2018 | Lee | |

FOREIGN PATENT DOCUMENTS

| | | | |
|---|---|---|---|
| TW | 200943769 A | 10/2009 | |
| WO | WO-2015115776 A1 | 8/2015 | |
| WO | WO-2018082910 A1 | 5/2018 | |

OTHER PUBLICATIONS

Swedish Search Report Application No. 2230114-7.
Alkhateeb A. et. al, Frequency Selective Hybrid Precoding for 1-16Limited Feedback Millimeter Wave Systems, Oct. 23, 2016, arxiv.org, doi: https://arxiv.org/abs/1510.00609; abstract; pp. 5-6.

* cited by examiner

METHOD FOR A MULTI-ANTENNA TRANSMITTER AND RECEIVER ARRANGEMENT, A COMPUTER PROGRAM PRODUCT, A MULTI-ANTENNA TRANSMITTER AND RECEIVER ARRANGEMENT, A WIRELESS DEVICE, AND A TRANSCEIVER NODE

CROSS-REFERENCE TO RELATED APPLICATIONS

This application is the US national phase of International Patent Application No. PCT/SE2023/050321 filed Apr. 6, 2023, which claims priority to Sweden Patent Application No. 2230114-7, filed Apr. 19, 2022. These applications are hereby incorporated by reference in their entireties.

TECHNICAL FIELD

The present disclosure relates to a method for a multi-antenna transmitter and receiver arrangement, a computer program product, a multi-antenna transmitter and receiver arrangement, a wireless device, and a transceiver node.

More specifically, the disclosure relates to a method for a multi-antenna transmitter and receiver arrangement, a computer program product, a multi-antenna transmitter and receiver arrangement, a wireless device, and a transceiver node as defined in the introductory parts of the independent claims.

BACKGROUND ART

Presently, there are three basic multiple-input multiple-output (MIMO) and beamforming (BF) transceiver architectures:

Analog BF, in which the radio signals from antennas are combined in the analog domain. This architecture may have problems, such as slow beam tracking, and that there is no channel knowledge per antenna, as only the combined channel is known. An example of analog BF can be found in US 2021/050893 A1.

Hybrid BF, in which radio signals of a subset of antennas is combined in the analog domain to combined streams and the combined streams are analog-to-digital (AD) converted and further combined in the digital domain. An example of hybrid BF can be found in U.S. Pat. No. 9,319,124 B2.

Digital BF, in which all streams are AD converted and combined in the digital domain. In digital BF there is full channel knowledge for all antennas. However, processing may be very complex and/or power consuming, e.g., if the number of antennas is large. An example of digital BF can be found in U.S. Pat. No. 9,054,845 B2.

Furthermore, from WO 2020/052880 A1 transmission of up-converted analog signals as well as utilization of digital to analog converters is known. However, there may still be a need for methods and/or apparatuses which are more efficient and/or have lower complexity/power consumption.

SUMMARY

An object of the present disclosure is to mitigate, alleviate or eliminate one or more of the above-identified deficiencies and disadvantages in the prior art and solve at least the above-mentioned problem.

According to a first aspect there is provided a method for a multi-antenna transmitter and receiver arrangement, the multi-antenna transmitter and receiver arrangement being comprisable in a wireless device, WD or in a transceiver node, TNode. The method comprises obtaining a first plurality of arrays, each array comprising digital signals, each digital signal comprising information; performing first beamforming processing on the first plurality of arrays to obtain a second plurality of processed digital signals; performing second beamforming processing in a time domain on the second plurality (m) of processed digital signals to obtain a third plurality (N) of digital signals; combining the third plurality of digital signals to obtain a third plurality of combined digital signals; converting each of the third plurality of combined digital signals to a respective analog signal; and transmitting each of the analog signals.

According to some embodiments, combining the third plurality of digital signals to obtain a third plurality of combined digital signals comprises combining each of the third plurality of digital signals with at least one other digital signal of the third plurality of digital signals to obtain a third plurality of combined digital signals, each of the combined digital signals thereby comprising components of at least two of the third plurality of digital signals.

According to some embodiments, converting comprises converting the third plurality of combined digital signals to a fourth plurality of analog baseband signals.

According to some embodiments, converting comprises up-converting each of the fourth plurality of analog baseband signals to a respective carrier frequency radio signal.

According to some embodiments, transmitting each of the analog signals comprises transmitting each of the carrier frequency radio signals.

According to some embodiments, performing first beamforming processing comprises pre-coding the first plurality of arrays; and processing the pre-coded arrays in a domain other than a time domain to obtain the second plurality of processed digital signals.

According to some embodiments, the domain other than the time domain is a frequency domain, a complex frequency domain, or a wavelet domain.

According to some embodiments, none of the third plurality of combined digital signals comprises any component of any signal other than the third plurality of digital signals.

According to some embodiments, the multi-antenna transmitter and receiver arrangement comprises a receiver arrangement.

According to some embodiments, the receiver arrangement comprises a spatial reception filter, the spatial reception filter comprises one or more spatio-temporal filters, and each spatio-temporal filter has one or more filter coefficients.

According to some embodiments, the multi-antenna transmitter and receiver arrangement comprises a transmitter arrangement comprising a spatial transmission filter, the spatial transmission filter comprises a second plurality of spatio-temporal filters, and each spatio-temporal filter has one or more filter coefficients.

According to some embodiments, performing second beamforming processing on the second plurality of processed digital signals comprises filtering the second plurality of digital signals.

According to some embodiments, filtering the second plurality of digital signals comprises spatio-temporally filtering, with/by spatio-temporal filters (having filter coefficients) of the spatial transmission filter.

According to some embodiments, the filter coefficients for the spatio-temporal filters are obtained based on information about radio signals received by the receiver arrangement.

According to some embodiments, the filter coefficients for the spatio-temporal filters of the spatial transmission filter are obtained in accordance with the filter coefficients for the spatio-temporal filters of the spatial reception filter.

According to some embodiments, the filter coefficients for the spatio-temporal filters of the spatial transmission filter are obtained or selected so that the spatial transmission filter is a complex conjugate of the spatial reception filter.

According to some embodiments, the method further comprises: receiving, by the receiver arrangement, a fifth plurality of analog radio signals; converting, by the receiver arrangement, the fifth plurality of analog radio signals into a fifth plurality of digital signals; extracting reference signals from each of the fifth plurality of digital signals; determining characteristics for each of the fifth plurality of digital signals based on the extracted reference signals; and obtaining the filter coefficients for the spatio-temporal filters of the spatial transmission filter based on the determined characteristics.

According to some embodiments, the first plurality is equal to the second plurality and the spatio-temporal filters of the spatial transmission filter are multi-tap filters.

According to some embodiments, pre-coding is performed on a per sub-carrier basis, by a pre-coder having one or more complex valued parameters, and the one or more complex valued parameters are obtained based on information about radio signals received by the receiver arrangement.

According to a second aspect there is provided a method of beamforming a first plurality of arrays, the first plurality of arrays comprising digital signals, each digital signal comprising information. The method comprises: performing first beamforming processing on the first plurality of arrays to obtain a second plurality of processed digital signals; performing second beamforming processing on the second plurality of digital signals to obtain a third plurality of processed digital signals; optionally combining the third plurality of digital signals to obtain a third plurality of combined digital signals; optionally converting each of the third plurality of combined digital signals to respective analog signals; and optionally transmitting each of the analog signals, and wherein the first beamforming processing is performed in a domain other than the time domain and the second beamforming processing is performed in the time domain.

According to a third aspect there is provided a computer program product comprising a non-transitory computer readable medium, having stored thereon a computer program comprising program instructions, the computer program being loadable into a data processing unit and configured to cause execution of the method of the first aspect, the second aspect, or any of the embodiments mentioned herein when the computer program is run by the data processing unit; a computer program product comprising instructions, which, when executed on at least one processor of a processing device, cause the processing device to carry out the method according to the first aspect, the second aspect, or any of the embodiments mentioned herein; or a non-transitory computer-readable storage medium storing one or more programs configured to be executed by one or more processors of a processing device, the one or more programs comprising instructions which, when executed by the processing device, causes the processing device to carry out the method according to the first aspect, the second aspect, or any of the embodiments mentioned herein.

According to a fourth aspect there is provided a multi-antenna transmitter and receiver arrangement, comprising controlling circuitry configured to cause: obtainment of a first plurality of arrays, each array comprising digital signals, each digital signal comprising information; performance of first beamforming processing on the first plurality of arrays to obtain a second plurality of processed digital signals; filtering of the second plurality of digital signals to obtain a third plurality of filtered digital signals; combination of the third plurality of digital signals to obtain a third plurality of combined digital signals; conversion of each of the third plurality of combined digital signals to respective analog signals; and transmission of each of the analog signals.

According to some embodiments, the multi-antenna transmitter and receiver arrangement comprises a transmitter arrangement comprising: a pre-coder configured to pre-code the first plurality of arrays; a first beamforming processing unit configured to process the first plurality of arrays to obtain the second plurality of processed digital signals; a second plurality of spatio-temporal filters configured to process the second plurality of arrays to obtain the third plurality of filtered digital signals; a filter control unit configured to determine filter coefficients of the second plurality of spatio-temporal filters; a third plurality of combiners, configured to combine the third plurality of digital signals to obtain the third plurality of combined digital signals; a fourth plurality of conversion units configured to convert each of the third plurality of combined digital signals to respective analog signals;

According to some embodiments, the multi-antenna transmitter and receiver arrangement comprises a receiver arrangement comprising: a sixth plurality, such as a fifth plurality, of analog to digital converters configured to convert the fifth plurality of analog radio signals into a fifth plurality of digital signals; an extraction unit configured to extract reference signals from each of the fifth plurality of digital signals; a channel analyzer configured to determine characteristics for each of the fifth plurality of digital signals based on the extracted reference signals.

According to some embodiments, the multi-antenna transmitter and receiver arrangement comprises a fourth plurality of transceivers configured to transmit each of the analog signals via a fourth plurality of antenna units and optionally configured to receive a fifth plurality of analog radio signals via the fourth plurality of antenna units.

According to some embodiments, the multi-antenna transmitter and receiver arrangement comprises a switch configured to switch the fourth plurality of transceivers between the transmitter arrangement and the receiver arrangement.

According to some embodiments, the multi-antenna transmitter and receiver arrangement comprises a chip, the chip comprising the pre-coder, the first beamforming processing unit, the second plurality of spatio-temporal filters, the filter control unit, and the combiners.

According to some embodiments, the multi-antenna transmitter and receiver arrangement comprises a first chip, the first chip comprising the pre-coder, the first beamforming processing unit and the filter control unit; a second chip, the second chip comprising the second plurality of spatio-temporal filters, and the combiners; and a digital interface, DI, configured to interface the first and second chips.

According to a fifth aspect there is provided a wireless device (WD) comprising the multi-antenna transmitter and receiver arrangement.

According to a sixth aspect there is provided a transceiver node (TNode) comprising the multi-antenna transmitter and receiver arrangement.

Effects and features of the second, third, fourth fifth and sixth aspects are fully or to a large extent analogous to those described above in connection with the first aspect and vice versa. Embodiments mentioned in relation to the first aspect are fully or largely compatible with the second, third, fourth, fifth and sixth aspects and vice versa.

An advantage of some embodiments is that power consumption is reduced or optimized (e.g., for the wireless device or for the transceiver node), e.g., since fewer digital streams needs to be transmitted via a digital interface.

Another advantage of some embodiments is a reduced complexity, e.g., since fewer transforms are needed (or less processing in a frequency domain is needed) due to fewer channels/streams.

Yet another advantage of some embodiments is a reduced complexity and power consumption, thus reducing power consumption (for processing units) and reducing the complexity of the system.

Yet another advantage of some embodiments is that energy efficiency is increased or improved.

A further advantage of some embodiments is that implementation is simplified.

Yet a further advantage of some embodiments is that out-of-band emission from radio signals is reduced (e.g., while the analog signals are made smoother).

Another advantage of some embodiments is that the complexity of the beamforming processing is reduced since some beamforming is performed in the time domain.

The present disclosure will become apparent from the detailed description given below. The detailed description and specific examples disclose preferred embodiments of the disclosure by way of illustration only. Those skilled in the art understand from guidance in the detailed description that changes, and modifications may be made within the scope of the disclosure.

Hence, it is to be understood that the herein disclosed disclosure is not limited to the particular component parts of the device described or steps of the methods described since such apparatus and method may vary. It is also to be understood that the terminology used herein is for purpose of describing particular embodiments only and is not intended to be limiting. It should be noted that, as used in the specification and the appended claims, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features, and advantages of the present disclosure, will be more fully appreciated by reference to the following illustrative and non-limiting detailed description of example embodiments of the present disclosure, when taken in conjunction with the accompanying drawings.

DETAILED DESCRIPTION

Figure 1A:
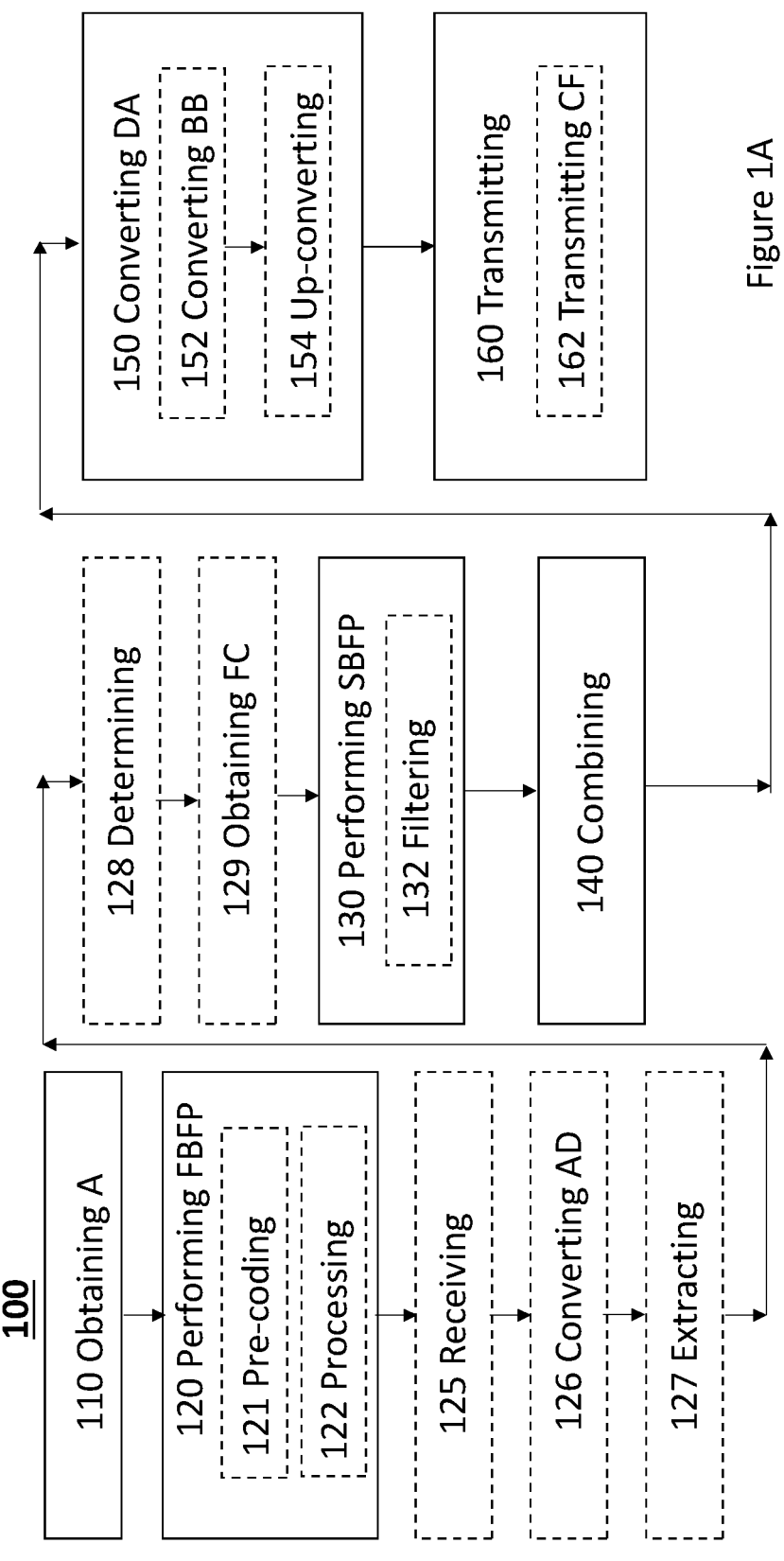
FIG. 1A is a schematic drawing illustrating method steps according to some embodiments.

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Terminology

Below is referred to a wireless device (WD). A wireless device is any device capable of transmitting or receiving signals wirelessly. Some examples of wireless devices are user equipment (UE), mobile phones, cell phones, smart phones, Internet of Things (IoT) devices, vehicle-to-everything (V2X) devices, vehicle-to-infrastructure (V21) devices, vehicle-to-network (V2N) devices, vehicle-to-vehicle (V2V) devices, vehicle-to-pedestrian (V2P) devices, vehicle-to-device (V2D) devices, vehicle-to-grid (V2G) devices, fixed wireless access (FWA) points, and tablets.

Below is referred to a "transceiver node" (TNode). A TNode may be a remote radio unit (RRU), a repeater, a remote wireless node, or a base station (BS), such as a radio base station (RBS), a Node B, an Evolved Node B (eNB) or a gNodeB (gNB). Furthermore, a TNode may be a BS for a neighboring cell, a BS for a handover (HO) candidate cell, a remote radio unit (RRU), a distributed unit (DU), another WD or a base station (BS) for a (active/deactivated) secondary cell (SCell) or for a serving/primary cell (PCell, e.g., associated with an active TCI state).

Below is referred to millimeter Wave (mmW) operation, mmW communication, mmW communication capability and mmW frequency range. The mmW frequency range is from 24.25 Gigahertz (GHz) to 71 GHz or more generally from 24 to 300 GHz. MmW may also be referred to as Frequency Range 2 (FR2).

Below is referred to a first and second beamforming processing units. The processing unit may be a digital processor. Alternatively, the processor may be a microprocessor, a microcontroller, a central processing unit, a co-processor, a graphics processing unit, a digital signal processor, an image signal processor, a quantum processing unit, or an analog signal processor. The processing unit may comprise one or more processors and optionally other units, such as a control unit.

Below is referred to a digital interface. A digital interface is a unit converting analog signals from e.g., transceivers to digital signals, which digital signals are conveyed to e.g., a baseband processor, and/or converting digital signals from e.g., a baseband processor to analog signals, which analog signals are conveyed to e.g., one or more transceivers. A digital interface possible also comprises filters and other pre-processing functions/units.

Below is referred to an antenna unit. An antenna unit may be one single antenna. However, an antenna unit may also be a dual antenna, such as a dual patch antenna with a first (e.g., horizontal) and a second (e.g., vertical) polarization, thus functioning as two separate antennas or an antenna unit having two ports.

Below is referred to a chip. A chip is an integrated circuit (chip) or a monolithic integrated circuit (chip) and may also be referred to as an IC, or a microchip.

Below is referred to a "function". A function is a relation that associates an input to a single output, e.g., relates an input a to a function value f(a) as an output. f(a) may be equal to 2 a, a*a, or a to the power of 3.

Below is referred to a "filter". A filter is a device or process that removes some features, components, or frequencies from a signal.

Basic Concept

A basic concept of the invention is a two-step beamforming (BF) procedure for a multi-antenna transmitter and receiver arrangement (with N antenna units) for Massive-MIMO and/or beamforming, which is suitable for the mmW frequency range of the radio spectrum. The two-step BF procedure is also suitable for other radio frequencies, such as frequencies below 24 GHz, e.g., when a large/massive number of transceivers is utilized. In some embodiments, the first BF processing stage of one or more layers of data streams (that may be MIMO layers and/or may have been pre-processed) is performed in a (complex) frequency domain to create m streams and the second BF processing stage is performed in time domain (by spatio-temporal filters) to process the m streams to N digital signals.

EMBODIMENTS

Figure 1B:
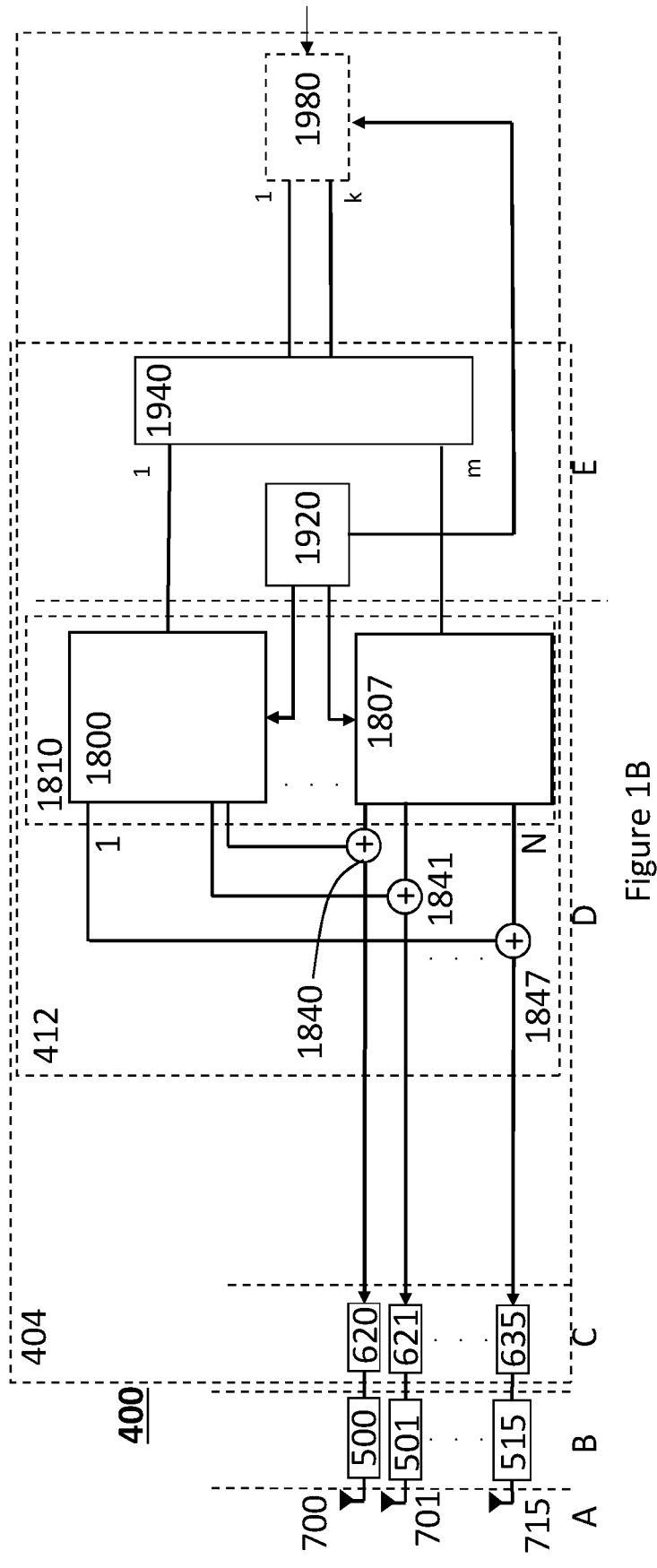
FIG. 1B is a schematic drawing illustrating a multi-antenna transmitter and receiver arrangement according to some embodiments.

In the following, embodiments will be described where FIG. 1A illustrates method steps according to some embodiments and FIG. 1B illustrates a multi-antenna transmitter and receiver arrangement according to some embodiments. The method 100 is for a multi-antenna transmitter and receiver arrangement 400. The multi-antenna transmitter and receiver arrangement 400 is comprisable in a wireless device (WD) or in a transceiver node (TNode), i.e., a WD or a TNode comprises the multi-antenna transmitter and receiver arrangement 400. The method 100 comprises obtaining 110 a first plurality (k) of arrays, each array comprising digital signals, each digital signal comprising information. In some embodiments, an array (of the first plurality of arrays) of digital signals comprises a set of information symbols, such as n-Quadrature amplitude modulation (n-QAM) or Quadrature Phase Shift Keying (QPSK). Furthermore, in some embodiments, the array may be a set of sub-carriers in an OFDM symbol. Thus, in some embodiments, the information comprises symbols, such as OFDM symbols. In some embodiments, the OFDM symbols are time domain symbols over a set of sub-carriers comprising n-QAM or QPSK. Furthermore, the method 100 comprises performing 120 first beamforming processing on the first plurality of arrays to obtain a second plurality (m) of processed digital signals. In some embodiments, performing 120 first beamforming processing comprises pre-coding 121 the first plurality of arrays, and processing 122 the pre-coded arrays in a domain other than a time domain to obtain the second plurality (m) of processed digital signals. In some embodiments, the domain other than the time domain is a frequency domain, a complex frequency domain, or a wavelet domain. In some embodiments, pre-coding 121 is performed on each element of the arrays, i.e., on a per sub-carrier basis (e.g., n-QAM or QPSK per carrier) by a pre-coder 1980 having one or more complex valued parameters. In some embodiments, the one or more complex valued parameters are obtained based on information about radio signals received by a receiver arrangement 402 (shown in FIG. 6). In some embodiments, the processing 122 comprises inverse transforming. In some embodiments, the inverse transforming comprises Inverse Discrete Fourier Transforming (IDFT), Inverse Fast Fourier transforming (IFFT), Inverse Laplace transforming, Inverse Wavelet transforming and/or Inverse Z-transforming. Preferably, the transforming 160 comprises IFFT. By inverse transforming k streams to only m (and not N) streams, i.e., to fewer streams than the number of transmitted analog radio signals, power consumption and/or complexity is reduced, e.g., since fewer transforms are needed due to fewer channels/streams.

Moreover, the method 100 comprises performing 130 second beamforming processing in a time domain on the second plurality (m) of processed digital signals to obtain a third plurality (N) of digital signals. In some embodiments, performing 130 second beamforming processing comprises applying functions to the second plurality (m) of processed digital signals to obtain a third plurality (N) of digital signals. A function may be implemented as a look-up table (LUT), in which an input a is mapped to an output f(a). Alternatively, performing 130 second beamforming processing comprises filtering 132, e.g., by/with filters, such as finite impulse response filters, infinite impulse response filters, non-linear filters, spatial filters, or spatio-temporal filters 1800, . . . 1807, the second plurality (m) of processed digital signals to obtain a third plurality (N) of (filtered) digital signals. The second beamforming processing 130 or the filtering 132 is, in some embodiments, performed in the time domain only. The method 100 comprises combining 140 (e.g., by/with combiners 1840, . . . , 1847) the third plurality (N) of digital signals (together) to obtain a third plurality (N) of combined digital signals (consisting of combinations of the third plurality of digital signals). In some embodiments, the combining 140 comprises combining each of the third plurality (N) of digital signals with at least one other digital signal of the third plurality (N) of digital signals to obtain a third plurality (N) of combined digital signals. Thus, each of the combined digital signals comprises components of at least two of the third plurality (N) of digital signals. Alternatively, the combining 140 comprises combining the third plurality (N) of digital signals with all other digital signals of the third plurality (N) of digital signals to obtain a third plurality (N) of combined digital signals. Thereby each of the combined digital signals comprises a component of each of the third plurality (N) of digital signals. In some embodiments, none of the third plurality (N) of combined digital signals comprises any component of any signal (e.g., reference signals) other than the third plurality (N) of digital signals. If reference signals are needed, they are either comprised by the third plurality (N) of digital signals or added to the combined digital signals (after the combining 140). Furthermore, the method 100 comprises converting 150 (e.g., by converters 620, . . . , 635) each of the third plurality (N) of combined digital signals to respective analog signals. In some embodiments, converting 150 comprises converting 152 the third plurality (N) of combined digital signals to a fourth plurality of analog baseband signals, e.g., by digital to analog converters (DACs) 642 (shown in FIG. 4), and up-converting 154 each of the fourth plurality of analog baseband signals to a respective carrier frequency radio signal, e.g., by up-converters 640 (shown in FIG. 4). In some embodiments, the carrier frequency is the same for all analog baseband signals. However, in other embodiments, the carrier frequency is a first carrier frequency for a first subset of analog baseband signals and the carrier frequency is a second carrier frequency for a second subset of analog baseband signals. The second carrier frequency is different from the first carrier frequency. In some embodiments, the first subset of analog baseband signals comprises only/all analog baseband signals not comprised in the second subset of analog baseband signals. In some embodiments, the second subset of analog baseband signals comprises only/all analog baseband signals not comprised in the first subset of analog baseband signals. Thus, by proper choice of spatio-temporal filters one can obtain carrier aggregation (CA; or dual connectivity) and an efficient CA transceiver arrangement may be obtained. Moreover, the method 100 comprises transmitting 160 each of the analog signals (e.g., by transceivers 500, 501, . . . , 515 transmitting each of the analog signals via a fourth plurality of antenna units 700, 701, . . . , 715). In some embodiments, transmitting 160 each of the analog signals comprises transmitting 162 each of the carrier frequency radio signals. Furthermore, in some embodiments, the first plurality (k) is smaller than or equal to the second plurality (m). Moreover, in some embodiments, the second plurality (m) is smaller than the third plurality (N). In some embodiments, the third plurality (N) is smaller than or equal to the fourth plurality.

In some embodiments, as shown in FIG. 1B, the multi-antenna transmitter and receiver arrangement 400 comprises a transmitter arrangement 404. The transmitter arrangement 404 comprises a pre-coder 1980. The pre-coder 1980 pre-codes or is configured to pre-code the first plurality of arrays. Furthermore, the transmitter arrangement 404 comprises a first beamforming processing unit 1940. The first beamforming processing unit 1940 processes or is configured to process the first plurality of arrays to obtain the second plurality (m) of processed digital signals. Moreover, the transmitter arrangement 404 comprises a second beamforming processing unit 1810. In some embodiments, the second beamforming processing unit 1810 comprises a second plurality (m) of filters, such as spatio-temporal filters 1800, . . . , 1807. Furthermore, in some embodiments, the second beamforming processing unit 1810 is or comprises a spatial transmission filter and the spatial transmission filter comprises the second plurality (m) of spatio-temporal filters 1800, . . . , 1807. The filters, e.g., the spatio-temporal filters 1800, . . . , 1807, processes or are configured to process the second plurality of arrays to obtain the third plurality (N) of (filtered) digital signals. The transmitter arrangement 404 comprises a filter control unit 1920. The filter control unit 1920 determines or is configured to determine filter coefficients of the second plurality (m) of spatio-temporal filters 1800, . . . , 1807. Furthermore, the transmitter arrangement 404 comprises a third plurality (N) of combiners 1840, . . . , 1847. The combiners 1840, . . . , 1847 combines or are configured to combine the third plurality (N) of digital signals to obtain the third plurality (N) of combined digital signals. Moreover, the transmitter arrangement 404 comprises a fourth plurality (I) of conversion units 620, . . . , 635. The conversion units 620, . . . , 635 convert or are configured to convert each of the third plurality (N) of combined digital signals to respective analog signals. In some embodiments, the fourth plurality (I) is equal to the third plurality (N), i.e., there is one conversion unit 620, . . . , 635 for each transceiver/analog signal. However, in other embodiments, the fourth plurality is twice as large as the third plurality (i.e., 2 N), i.e., there are two conversion units for each analog signal, e.g., one for an in-phase (I) branch and one for a quadrature phase (Q) branch. Alternatively, the fourth plurality is four times as large as the third plurality, e.g., if dual polarized antenna units are utilized and there are 2 transceivers per chip.

Figure 6:
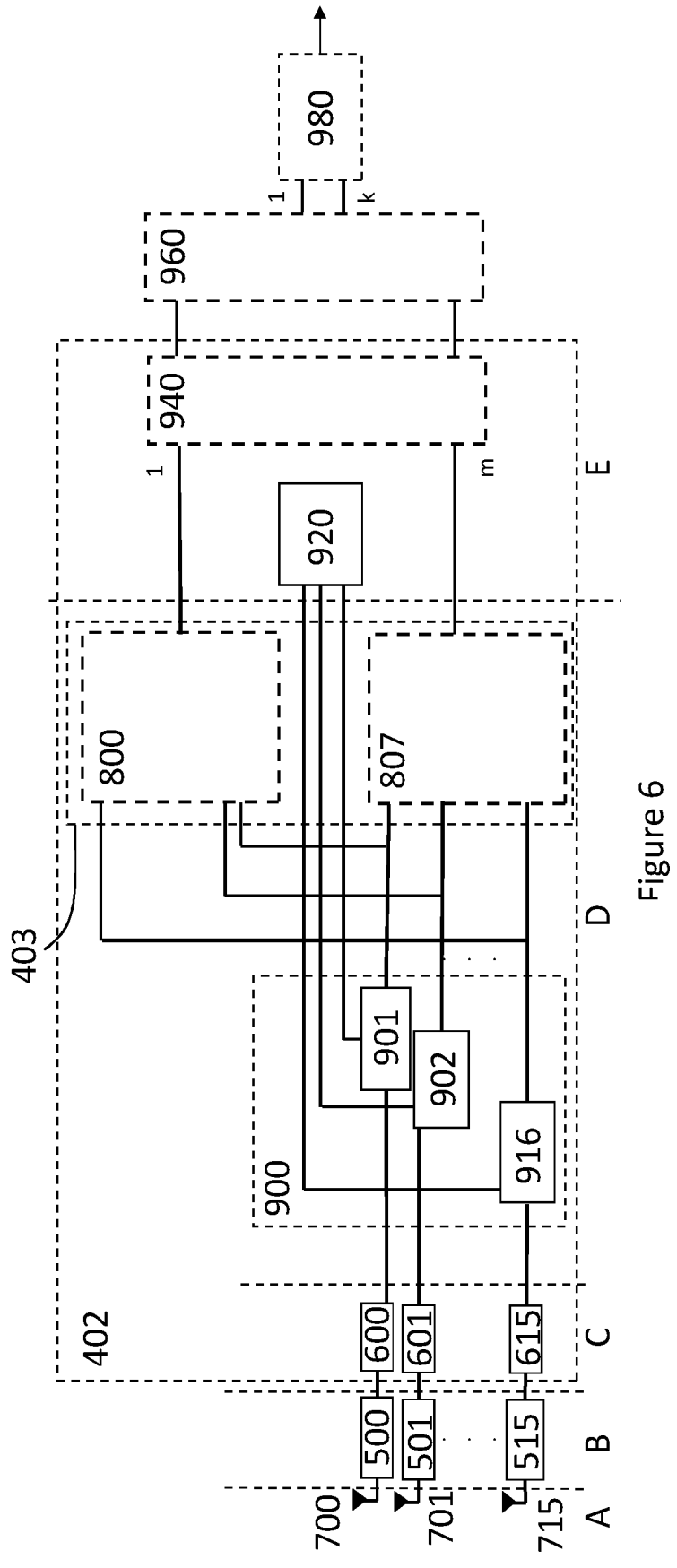
FIG. 6 is a schematic drawing illustrating a receiver arrangement connected to transceivers and antennas according to some embodiments.

In some embodiments, the multi-antenna transmitter and receiver arrangement 400 comprises a receiver arrangement 402 (shown in FIG. 6).

Furthermore, the multi-antenna transmitter and receiver arrangement 400 comprises a fourth plurality of transceivers 500, 501, . . . , 515. The transceivers 500, 501, . . . , 515 transmits or are configured to transmit each of the analog signals via a fourth plurality of antenna units 700, 701, . . . , 715 (e.g., during a transmission mode). In some embodiments, the transceivers 500, 501, . . . , 515 receives or are configured to receive a fifth plurality of analog radio signals via the fourth plurality of antenna units 700, 701, . . . , 715 (e.g., during a reception mode).

In some embodiments, the multi-antenna transmitter and receiver arrangement 400 comprises a chip 412 (shown in FIG. 1B). The chip 412 comprises the pre-coder 1980, the first beamforming processing unit 1940, the second beamforming processing unit 1810, the filter control unit 1920 and the combiners 1840, . . . , 1847. Furthermore, the chip is clocked with a clock (or an oscillator) having a chip frequency/rate.

In some embodiments, the second plurality of processed digital signals are up-sampled (thereby producing an approximation of the signals that would have been obtained by sampling the signal at a higher rate), e.g., with a higher sampling rate than the chip rate, before being sent to/processed by the spatio-temporal filters 1800, . . . , 1807. Alternatively, or additionally, the third plurality (N) of combined digital signals are up-sampled, e.g., with a higher sampling rate than the chip rate, before being converted to analog signals (by converters 620, . . . , 635 or by DA converters). By up-sampling (oversampling), out-of-band emission from radio signals is reduced (while the analog signals are made smoother).

However, in some embodiments, the multi-antenna transmitter and receiver arrangement (400) comprises a first chip. The first chip comprises the pre-coder 1980, the first beamforming processing unit 1940 and the filter control unit 1920. Furthermore, the multi-antenna transmitter and receiver arrangement (400) comprises a second chip. The second chip comprises the second beamforming processing unit 1810, and the combiners 1840, . . . , 1847. Moreover, the multi-antenna transmitter and receiver arrangement 400 comprises a digital interface, DI. The DI interfaces or is configured to interface the first and second chips.

Figures 2, 4, 5:
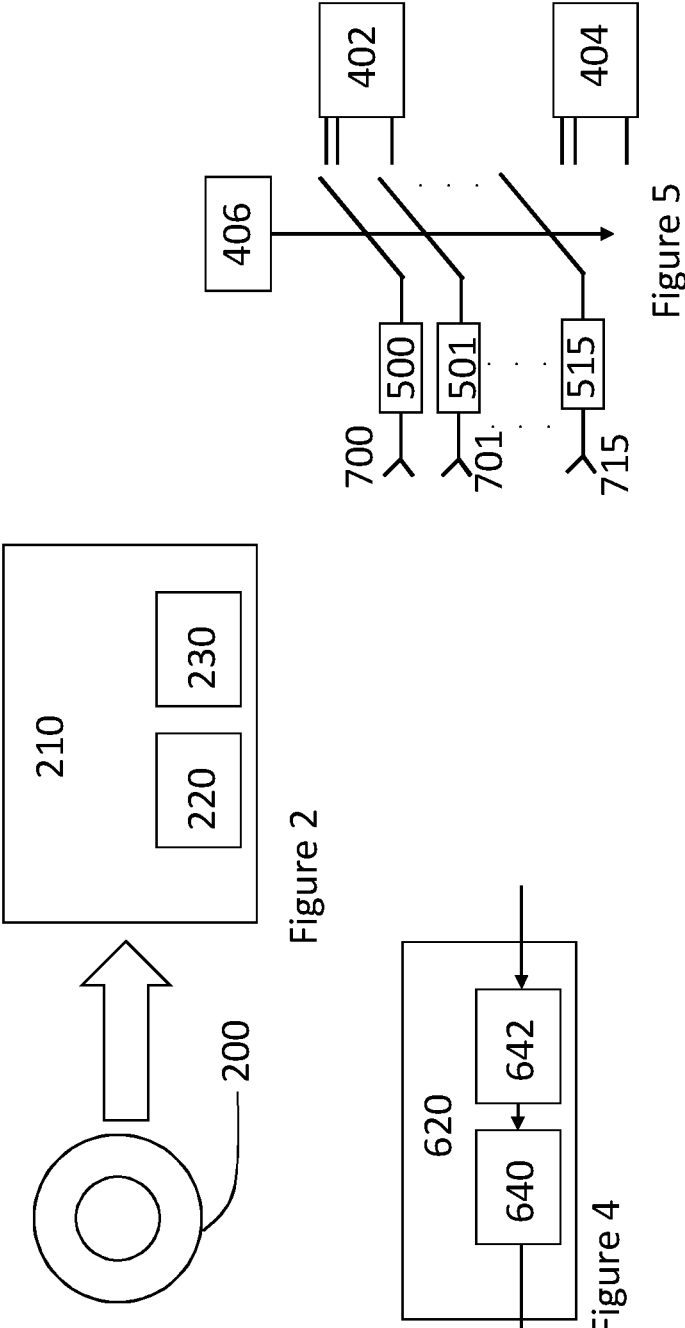
FIG. 2 is a schematic drawing illustrating a computer readable medium according to some embodiments.
FIG. 4 is a schematic drawing illustrating a conversion unit according to some embodiments.
FIG. 5 is a schematic drawing illustrating a switch for switching transceivers between the transmitter arrangement and the receiver arrangement according to some embodiments.

According to some embodiments, a computer program product comprising a non-transitory computer readable medium 200, such as a punch card, a compact disc (CD) ROM, a read only memory (ROM), a digital versatile disc (DVD), an embedded drive, a plug-in card, a random access memory (RAM) or a universal serial bus (USB) memory, is provided. FIG. 2 illustrates an example computer readable medium in the form of a compact disc (CD) ROM 200. The computer readable medium has stored thereon, a computer program comprising program instructions. The computer program is loadable into a data processor (PROC) 220, which may, for example, be comprised in a computer 210 or a computing device or a control unit. When loaded into the data processor, the computer program may be stored in a memory (MEM) 230 associated with or comprised in the data processor. According to some embodiments, the computer program may, when loaded into and run by the data processor, cause execution of method steps according to, for example, the method illustrated in FIG. 1, which is described herein. Furthermore, in some embodiments, there is provided a computer program product comprising instructions, which, when executed on at least one processor of a processing device, cause the processing device to carry out the method illustrated in FIG. 1. Moreover, in some embodiments, there is provided a non-transitory computer-readable storage medium storing one or more programs configured to be executed by one or more processors of a processing device, the one or more programs comprising instructions which, when executed by the processing device, causes the processing device to carry out the method illustrated in FIG. 1.

Figure 3:
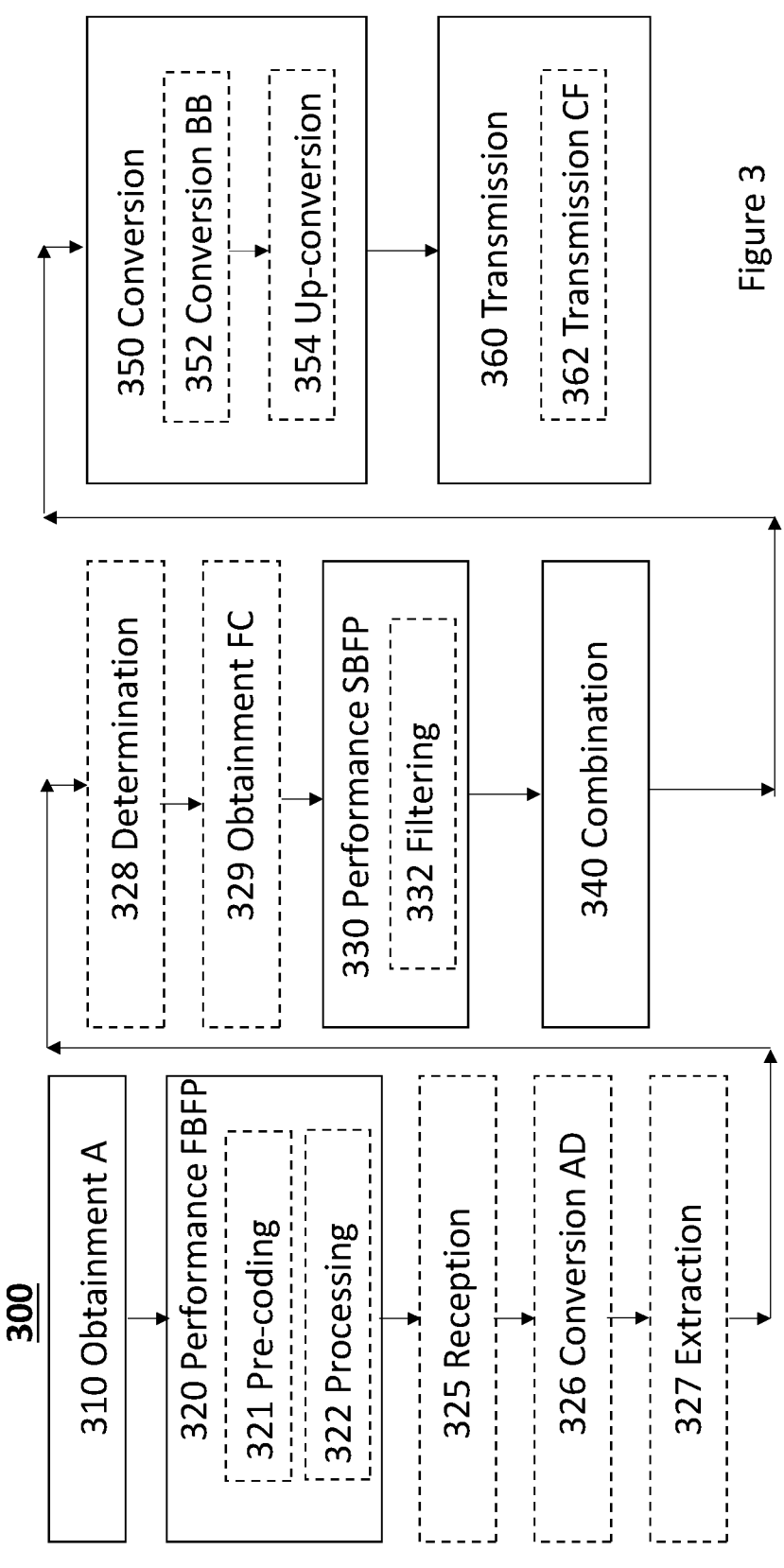
FIG. 3 is a flowchart illustrating method steps implemented in a multi-antenna transmitter and receiver arrangement, or in a control unit thereof, according to some embodiments.

FIG. 3 illustrates method steps implemented in a multi-antenna transmitter and receiver arrangement 400 (or in a control unit or controlling circuitry thereof) according to some embodiments. The control circuitry causes or is configured to cause obtainment 310 of a first plurality (k) of arrays. Each array comprises digital signals. Each digital signal comprises information. To this end, the controlling circuitry may be associated with (e.g., operatively connectable, or connected, to) an obtainment unit (e.g., obtaining circuitry or an obtainer). Furthermore, the control circuitry causes or is configured to cause performance 320 of first beamforming processing on the first plurality of arrays to obtain a second plurality (m) of processed digital signals. To this end, the controlling circuitry may be associated with (e.g., operatively connectable, or connected, to) a first beamforming processing unit 1940 (e.g., beamforming processing circuitry or a beamforming processor). Moreover, the control circuitry causes or is configured to cause performance 323 of first beamforming processing on the second plurality (m) of processed digital signals to obtain a third plurality (N) of digital signals. To this end, the controlling circuitry may be associated with (e.g., operatively connectable, or connected, to) a second beamforming processing unit 1810 (e.g., beamforming processing circuitry, a beamforming processor, or filters, such as spatio-temporal filters 1800, . . . , 1807). The control circuitry causes or is configured to cause combination 340 of the third plurality (N) of digital signals to obtain a third plurality (N) of combined digital signals or of each the third plurality (N) of digital signals with at least one other digital signal of the third plurality (N) of digital signals. Thus, each combined digital signal consists of a combination of the third plurality of digital signals. To this end, the controlling circuitry may be associated with (e.g., operatively connectable, or connected, to) a plurality of combining units (e.g., combining circuitry or combiners, such as the third plurality of combiners 1840, . . . , 1847). In some embodiments, the combiners are adders. Alternatively, the combiners are units adding absolute values together. As another alternative, the combiners are units adding squared values together. As yet another alternative, the combiners are summers. Furthermore, the control circuitry causes or is configured to cause conversion 350 of each of the third plurality (N) of combined digital signals to respective analog signals. To this end, the controlling circuitry may be associated with (e.g., operatively connectable, or connected, to) a plurality of conversion units (e.g., converting circuitry or converters). Moreover, the control circuitry causes or is configured to cause transmission 360 of each of the analog signals. To this end, the controlling circuitry may be associated with (e.g., operatively connectable, or connected, to) transmission units (e.g., transmitting circuitry or transmitters or transceivers 500, 501, . . . , 515 and associated antenna units 700,

701, . . . , 715). In some embodiments, the control circuitry causes or is configured to cause pre-coding 321 the first plurality of arrays. To this end, the controlling circuitry may be associated with (e.g., operatively connectable, or connected, to) a pre-coding unit (e.g., pre-coding circuitry or a precoder 1980). Furthermore, in some embodiments, the control circuitry causes or is configured to cause processing 322 the pre-coded arrays in a domain other than a time domain to obtain the second plurality (m) of processed digital signals. To this end, the controlling circuitry may be associated with (e.g., operatively connectable, or connected, to) one or more processing units (e.g., processing circuitry or processors). The processors may be inverse Discrete Fourier Transformers (IDFT), Inverse Fast Fourier transformers (IFFT), Inverse Laplace transformers, Inverse Wavelet transformers and/or Inverse Z-transformers.

In some embodiments, the control circuitry causes or is configured to cause reception 325 of a fifth plurality of analog radio signals. To this end, the controlling circuitry may be associated with (e.g., operatively connectable, or connected, to) a receiver arrangement 402 (e.g., receiving circuitry or a receiver or transceivers 500, 501, . . . , 515). In some embodiments, the control circuitry causes or is configured to cause conversion 326 of the fifth plurality of analog radio signals into a fifth plurality of digital signals. To this end, the controlling circuitry may be associated with (e.g., operatively connectable, or connected, to) a receiver arrangement 402 (e.g., receiving circuitry or a receiver or ADCs 600, 601, . . . , 615 seen in FIG. 6). In some embodiments, the control circuitry causes or is configured to cause extraction 327 of reference signals from each of the fifth plurality of digital signals. To this end, the controlling circuitry may be associated with (e.g., operatively connectable, or connected, to) a receiver arrangement 402 (e.g., receiving circuitry or a receiver or extraction unit 900/sub-extraction units 901, 902, . . . , 916 seen in FIG. 6). In some embodiments, the control circuitry causes or is configured to cause determination 328 of characteristics for each of the fifth plurality of digital signals based on the extracted reference signals. To this end, the controlling circuitry may be associated with (e.g., operatively connectable, or connected, to) a receiver arrangement 402 (e.g., receiving circuitry or a receiver or channel analyzer 920 seen in FIG. 6). In some embodiments, the control circuitry causes or is configured to cause obtainment 329 of the filter coefficients for the spatio-temporal filters 1800, . . . , 1807 based on the determined characteristics. To this end, the controlling circuitry may be associated with (e.g., operatively connectable, or connected, to) a filter coefficient determining unit (e.g., filter coefficient determining circuitry, a filter coefficient determiner, or the filter control unit 1920). I.e., in some embodiments, the filter control unit 1920 receives determined characteristics from the channel analyzer 920 and determines the filter coefficients based on the determined characteristics. In some embodiments, the control circuitry causes or is configured to cause filtering, such as spatio-temporally filtering 332. To this end, the controlling circuitry may be associated with (e.g., operatively connectable, or connected, to) filtering or spatio-temporally filtering units (e.g., filtering circuitry, filters, spatio-temporally filtering circuitry or spatio-temporally filters 1800, . . . , 1807). In some embodiments, the control circuitry causes or is configured to cause conversion 352 of the third plurality (N) of combined digital signals to a fourth plurality of analog baseband signals. To this end, the controlling circuitry may be associated with (e.g., operatively connectable, or connected, to) digital to analog (DA) conversion units (e.g., digital to analog converting circuitry or DA converters 642). In some embodiments, the control circuitry causes or is configured to cause up-conversion 354 of each of the fourth plurality (N) of analog baseband signals to a respective carrier frequency radio signal. To this end, the controlling circuitry may be associated with (e.g., operatively connectable, or connected, to) up-conversion units (e.g., up-converting circuitry or up-converters 640). In some embodiments, the control circuitry causes or is configured to cause transmitting 362 each of the carrier frequency radio signals. To this end, the controlling circuitry may be associated with (e.g., operatively connectable, or connected, to) transmission units (e.g., transmitting circuitry or transmitters or transceivers 500, 501, . . . , 515 and associated antenna units 700, 701, . . . , 715).

FIG. 4 illustrates a conversion unit 620 according to some embodiments. The conversion unit 620 comprises a digital to analog (DA) converter 642 and an up-converter 640. The DA converter 642 converts a digital signal into an analog signal and the up-converter 640 converts an analog signal, such as a baseband signal, to an analog signal with a higher frequency, such as a carrier frequency radio signal. Although only the converter 620 is shown in FIG. 4, all converters 620, . . . , 635 function the same way (i.e., comprises a DA converter 642 and an up-converter 640).

Moreover, in some embodiments, as illustrated in FIG. 5, the multi-antenna transmitter and receiver arrangement 400 comprises a switch 406 configured to switch the fourth plurality of transceivers 500, 501, . . . , 515 (which are connected or connectable to antenna units 700, 701, . . . , 715) between the transmitter arrangement 404 and the receiver arrangement 402. As an example, the switch connects the transmitter arrangement 404 to the transceivers 500, 501, . . . , 515 when the multi-antenna transmitter and receiver arrangement 400 enters a transmission mode (and/or while the multi-antenna transmitter and receiver arrangement 400 is in the transmission mode) and the switch connects the receiver arrangement 402 to the transceivers 500, 501, . . . , 515 when the multi-antenna transmitter and receiver arrangement 400 enters a reception mode (and/or while the multi-antenna transmitter and receiver arrangement 400 is in the reception mode).

FIG. 6 illustrates a receiver arrangement 402 connected to transceivers 500, 501, . . . , 515 and to antenna units 700, 701, . . . , 715. In some embodiments, the multi-antenna transmitter and receiver arrangement 400 comprises the receiver arrangement 402. The receiver arrangement 402 comprises a sixth plurality, such as a fifth plurality, of analog to digital (AD) converters 600, 601, . . . , 615. The AD converters 600, 601, . . . , 615 convert or are configured to convert the fifth plurality of analog radio signals into a fifth plurality of digital (baseband) signals. The fifth plurality (I) may be equal to the sixth plurality (N), i.e., there is one AD converter for each receiver/transceiver/analog signal. However, in other embodiments, the sixth plurality is twice as large as the fifth plurality (i.e., 2 N), i.e., there are two AD converters for each analog signal, e.g., one for an in-phase (I) branch and one for a quadrature phase (Q) branch. Furthermore, the receiver arrangement 402 comprises an extraction unit 900. The extraction unit 900 extracts or is configured to extract reference signals from each of the fifth plurality of digital signals. In some embodiments, the extraction unit 900 comprises a first plurality (N) of sub-extraction units 901, 902, . . . , 916, i.e., one sub-extraction unit for each digital signal. Moreover, the receiver arrangement 402 comprises a channel analyzer 920. The channel analyzer 920 determines or is configured to determine characteristics for each of the fifth plurality of digital signals based on the extracted reference signals. In some embodiments, the characteristics is a (time domain) radio channel characteristics. In some embodiments, the characteristics comprises channel estimates, such as radio channel estimates, e.g., for each of the digital signals. In some embodiments, the characteristics comprises radio channel filter taps indicative of the radio channel characteristics.

Furthermore, the receiver arrangement 402 comprises one or more (e.g., a plurality of) spatio-temporal filters 800, . . . , 807. Moreover, in some embodiments, the receiver arrangement 402 comprises a spatial reception filter 403 and the spatial reception filter 403 comprises the one or more spatio-temporal filters 800, . . . , 807. Each of the spatio-temporal filters 800, . . . , 807 has one or more filter coefficients. The spatio-temporal filters 800, . . . , 807 are configured to process or processes the plurality of digital signals to obtain a plurality of combined signals. In some embodiments, the receiver arrangement 402 comprises a transform unit 940. The transform unit 940 is configured to transform or transforms each of the plurality of combined signals into a frequency domain. In some embodiments, the transform unit 940 is or comprises a plurality of transform sub-units. Each transform sub-unit is configured (connected and otherwise adapted) to process a respective signal of the plurality of combined signals. In some embodiments, the transform unit transforms each of the combined signals in a serial manner. Furthermore, in some embodiments, the multi-antenna receiver arrangement 400 comprises a post-processing unit 960. The post-processing unit 960 is configured to post-process or post-processes the transformed signals in the frequency domain to obtain a plurality of frequency domain processed signals. Moreover, in some embodiments, the plurality of analog radio signals is coded. Thus, in some embodiments, the multi-antenna receiver arrangement 400 comprises a decoder 980. The decoder 980 is configured to decode or decodes the plurality of frequency domain processed signals (in order to obtain information signals).

Returning to FIG. 1A, in some embodiments, performing 130 second beamforming processing on the second plurality (m) of digital signals comprises spatio-temporally filtering 132 by/with the spatio-temporal filters 1800, . . . , 1807 of the spatial transmission filter. Each spatio-temporal filter 1800, . . . , 1807 has one or more filter coefficients. The one or more filter coefficients for the spatio-temporal filters 1800, . . . , 1807 (of the spatial transmission filter) are obtained based on information about radio signals received by the receiver arrangement 402. Alternatively, the one or more filter coefficients for the spatio-temporal filters 1800, . . . , 1807 (of the spatial transmission filter) are obtained in accordance with the filter coefficients for the spatio-temporal filters 800, . . . , 807 of the spatial reception filter. In some embodiments, the filter coefficients for the spatio-temporal filters 1800, . . . , 1807 of the spatial transmission filter are obtained or selected so that the spatial transmission filter is a complex conjugate of the spatial reception filter. Furthermore, in some embodiments, the method 100 comprises receiving 125, by the receiver arrangement 402, a fifth plurality of analog radio signals; converting 126, by the receiver arrangement 402, the fifth plurality of analog radio signals into a fifth plurality of digital signals; extracting 127 reference signals from each of the fifth plurality of digital signals; determining 128 characteristics for each of the fifth plurality of digital signals based on the extracted reference signals; and obtaining 129 the filter coefficients for the spatio-temporal filters $1800, \ldots, 1807$ of the spatial transmission filter based on the determined characteristics (e.g., by the filter control unit 1920). In some embodiments, the fifth plurality is equal to the fourth plurality.

In some embodiments, the first plurality is equal to the second plurality and the spatio-temporal filters $1800, \ldots,$ 1807 of the spatial transmission filter are multi-tap filters, i.e., filters with more than one tap (coefficient/delay pair). This reduces the complexity of the beamforming processing, e.g., for multi-path radio channel, since some beamforming is performed in the time domain.

Figure 7:
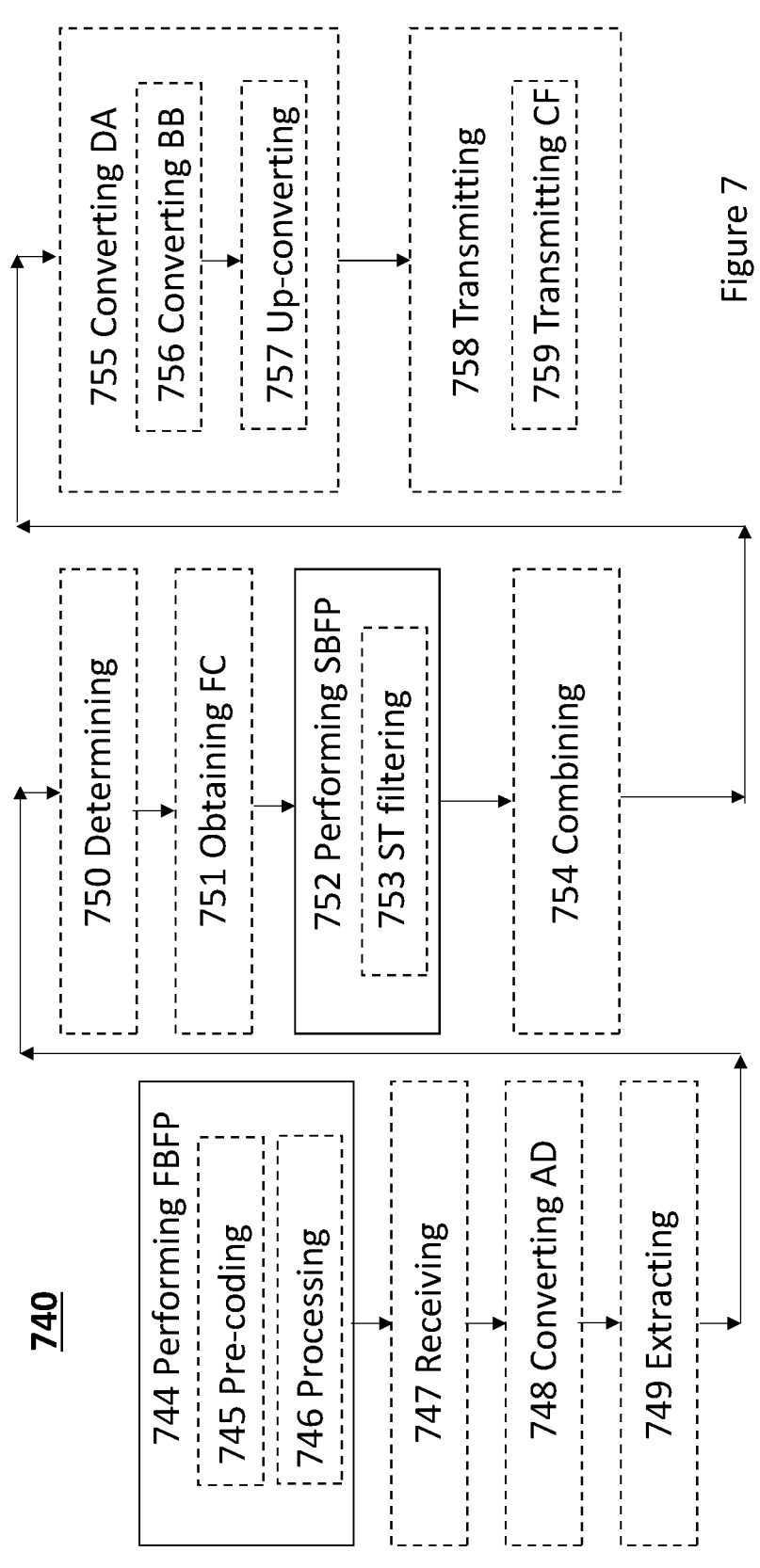
FIG. 7 is a schematic drawing illustrating method steps according to some embodiments.

FIG. 7 illustrates method steps of a method 740 according to some embodiments. The method 740 is a method of beamforming a first plurality (k) of arrays. The first plurality (k) of arrays comprises digital signals. Each digital signal comprises information. The method 740 comprises performing 744 first beamforming processing on the first plurality of arrays to obtain a second plurality (m) of processed digital signals. Furthermore, the method 740 comprises performing 752 second beamforming processing on the second plurality (m) of digital signals to obtain a third plurality (N) of processed digital signals. Optionally, the method 740 comprises combining 754 the third plurality (N) of digital signals (together) to obtain a third plurality (N) of combined digital signals (consisting of combinations of the third plurality of digital signals). In some embodiments, the combining 754 comprises combining each of the third plurality (N) of digital signals with at least one other digital signal of the third plurality (N) of digital signals to obtain a third plurality (N) of combined digital signals. Thus, each of the combined digital signals comprises components of at least two of the third plurality (N) of digital signals. Alternatively, the combining 754 comprises combining the third plurality (N) of digital signals with all other digital signals of the third plurality (N) of digital signals to obtain a third plurality (N) of combined digital signals. Thereby each of the combined digital signals comprises a component of each of the third plurality (N) of digital signals. In some embodiments, none of the third plurality (N) of combined digital signals comprises any component of any signal (e.g., reference signals) other than the third plurality (N) of digital signals. If reference signals are needed, they are either comprised by the third plurality (N) of digital signals or added to the combined digital signals (after the combining 754). Furthermore, optionally, the method 740 comprises converting 755 each of the third plurality (N) of combined digital signals to respective analog signals. Moreover, optionally the method 740 comprises transmitting 758 each of the analog signals. The first beamforming processing is performed in a domain other than the time domain, e.g., a frequency domain, a complex frequency domain or a wavelet domain and the second beamforming processing is performed in the time domain. The optional steps of the method 740, i.e., receiving 747, converting (AD) 748, extracting 749, determining 750, obtaining filter coefficients 751, spatio-temporal filtering 753, combining 754, converting (DA) 755, converting (BB) 756, up-converting 757, transmitting 758 and transmitting carrier frequency radio signals 759 are the same or similar to the steps 125-129 (747-751), 132 (753), 140 (754), 150 (755), 152 (756), 154 (757), 160 (758) and 162 (759) of the method 100. In some embodiments, the method 740 is comprised in (or forms part of) the method 100.

LIST OF EXAMPLES

Example 1. A method (100) for a multi-antenna transmitter and receiver arrangement (400), the multi-antenna transmitter and receiver arrangement (400) being comprisable in a wireless device, WD or in a transceiver node, TNode, the method comprising:

obtaining (110) a first plurality (k) of arrays, each array comprising digital signals, each digital signal comprising information;

performing (120) first beamforming processing on the first plurality of arrays to obtain a second plurality (m) of processed digital signals;

performing (130) second beamforming processing in a time domain on the second plurality (m) of processed digital signals to obtain a third plurality (N) of digital signals;

combining (140) the third plurality (N) of digital signals to obtain a third plurality (N) of combined digital signals;

converting (150) each of the third plurality (N) of combined digital signals to respective analog signals; and transmitting (160) each of the analog signals.

Example 2. The method of example 1, wherein converting (150) comprises:

converting (152) the third plurality (N) of combined digital signals to a fourth plurality of analog baseband signals; and up-converting (154) each of the fourth plurality (N) of analog baseband signals to a respective carrier frequency radio signal; and wherein transmitting (160) each of the analog signals comprises transmitting (162) each of the carrier frequency radio signals.

Example 3. The method of any of examples 1-2, wherein performing (120) first beamforming processing comprises:

pre-coding (121) the first plurality of arrays; and processing (122) the pre-coded arrays in a domain other than the time domain to obtain the second plurality (m) of processed digital signals.

Example 4. The method of example 3, wherein the domain other than the time domain is a frequency domain, a complex frequency domain, or a wavelet domain.

Example 5. The method of any of examples 1-4, wherein the multi-antenna transmitter and receiver arrangement (400) comprises a receiver arrangement (402);

wherein performing (130) second beamforming processing on the second plurality (m) of processed digital signals comprises spatio-temporally filtering (132) the second plurality (m) of digital signals, by spatio-temporal filters (1800, ..., 1807) having filter coefficients; and wherein the filter coefficients for the spatio-temporal filters (1800, ..., 1807) are obtained based on information about radio signals received by the receiver arrangement (402).

Example 6. The method of example 5, further comprising:

receiving (125), by the receiver arrangement (402), a fifth plurality of analog radio signals;

converting (126), by the receiver arrangement (402), the fifth plurality of analog radio signals into a fifth plurality of digital signals;

extracting (127) reference signals from each of the fifth plurality of digital signals;

determining (128) characteristics for each of the fifth plurality of digital signals based on the extracted reference signals; and obtaining (129) the filter coefficients for the spatio-temporal filters (1800, ..., 1807) based on the determined characteristics.

Example 7. The method of any of examples 5-6, wherein the first plurality is equal to the second plurality and wherein the spatio-temporal filters (1800, . . . , 1807) are multi-tap filters.

Example 8. The method of any of examples 3-7, wherein pre-coding (121) is performed on a per sub-carrier basis by a pre-coder (1980) having one or more complex valued parameters, wherein the one or more complex valued parameters are obtained based on information about radio signals received by the receiver arrangement (402).

Example 9. A method (740) of beamforming a first plurality (k) of arrays, the first plurality (k) of arrays comprising digital signals, each digital signal comprising information, the method comprising:

performing (744) first beamforming processing on the first plurality of arrays to obtain a second plurality (m) of processed digital signals;

performing (752) second beamforming processing on the second plurality (m) of digital signals to obtain a third plurality (N) of processed digital signals;

optionally combining (754) the third plurality (N) of digital signals to obtain a third plurality (N) of combined digital signals;

optionally converting (755) each of the third plurality (N) of combined digital signals to respective analog signals; and optionally transmitting (758) each of the analog signals, and wherein the first beamforming processing is performed in a domain other than the time domain and the second beamforming processing is performed in the time domain.

Example 10. A computer program product comprising a non-transitory computer readable medium (200), having stored thereon a computer program comprising program instructions, the computer program being loadable into a data processing unit (220) and configured to cause execution of the method of any of examples 1-9 when the computer program is run by the data processing unit.

Example 11. A multi-antenna transmitter and receiver arrangement (400), comprising controlling circuitry configured to cause:

obtainment (310) of a first plurality (k) of arrays, each array comprising digital signals, each digital signal comprising information;

performance (320) of first beamforming processing on the first plurality of arrays to obtain a second plurality (m) of processed digital signals;

performance (330) of second beamforming processing in a time domain on the second plurality (m) of processed digital signals to obtain a third plurality (N) of digital signals;

combination (340) of the third plurality (N) of digital signals to obtain a third plurality (N) of combined digital signals;

conversion (350) of each of the third plurality (N) of combined digital signals to respective analog signals; and transmission (360) of each of the analog signals.

Example 12. The multi-antenna transmitter and receiver arrangement (400) of example 11 comprising:

a transmitter arrangement (404) comprising:

a pre-coder (1980) configured to pre-code the first plurality of arrays;

a first beamforming processing unit (1940) configured to process the first plurality of arrays to obtain the second plurality (m) of processed digital signals;

a second beamforming processing unit (1810) comprising a second plurality (m) of spatio-temporal filters (1800, . . . , 1807) configured to process the second plurality of arrays to obtain the third plurality (N) of digital signals;

a filter control unit (1920) configured to determine filter coefficients of the second plurality (m) of spatio-temporal filters (1800, . . . , 1807);

a third plurality (N) of combiners (1840, . . . , 1847), configured to combine the third plurality (N) of digital signals to obtain the third plurality (N) of combined digital signals;

a fourth plurality of conversion units (620, . . . , 635) configured to convert each of the third plurality (N) of combined digital signals to respective analog signals;

optionally a receiver arrangement (402) comprising:

a sixth plurality, such as a fifth plurality, of analog to digital converters (600, 601, . . . , 615) configured to convert the fifth plurality of analog radio signals into a fifth plurality of digital signals;

an extraction unit (900) configured to extract reference signals from each of the fifth plurality of digital signals; and a channel analyzer (920) configured to determine characteristics for each of the fifth plurality of digital signals based on the extracted reference signals;

a fourth plurality of transceivers (500, 501, . . . , 515) configured to transmit each of the analog signals via a fourth plurality of antenna units (700, 701, . . . , 715) and optionally configured to receive a fifth plurality of analog radio signals via the fourth plurality of antenna units (700, 701, . . . , 715); and optionally a switch (406) configured to switch the fourth plurality of transceivers (500, 501, . . . , 515) between the transmitter arrangement (404) and the receiver arrangement (402).

Example 13. The multi-antenna transmitter and receiver arrangement (400) of example 12 comprising a chip, the chip comprising the pre-coder (1980), the first beamforming processing unit (1940), the second beamforming processing unit (1810), the filter control unit (1920) and the combiners (1840, . . . , 1847).

Example 14. The multi-antenna transmitter and receiver arrangement (400) of example 12, comprising:

a first chip, the first chip comprising the pre-coder (1980), the first beamforming processing unit (1940) and the filter control unit (1920);

a second chip, the second chip comprising the second beamforming processing unit (1810), and the combiners (1840, . . . , 1847); and a digital interface, DI, configured to interface the first and second chips.

Example 15. A wireless device, WD, comprising the multi-antenna transmitter and receiver arrangement (400) of any of examples 11-14.

Example 16. A transceiver node, TNode, comprising the multi-antenna transmitter and receiver arrangement (400) of any of examples 11-14.

Generally, all terms used herein are to be interpreted according to their ordinary meaning in the relevant technical field, unless a different meaning is clearly given and/or is implied from the context in which it is used. Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step. In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer e.g., a single) unit. Any feature of any of the embodiments/aspects disclosed herein may be applied to any other embodiment/aspect, wherever suitable. Likewise, any advantage of any of the embodiments may apply to any other embodiments, and vice versa. Hence, it should be understood that the details of the described embodiments are merely examples brought forward for illustrative purposes, and that all variations that fall within the scope of the claims are intended to be embraced therein.

The invention claimed is:

1. A method for a multi-antenna transmitter and receiver arrangement, the multi-antenna transmitter and receiver arrangement being comprisable in a wireless device (WD), wherein the multi-antenna transmitter and receiver arrangement comprises a receiver arrangement, wherein the receiver arrangement comprises a spatial reception filter, wherein the spatial reception filter comprises one or more spatio-temporal filters, wherein each spatio-temporal filter has one or more filter coefficients, wherein the multi-antenna transmitter and receiver arrangement comprises a transmitter arrangement, wherein the transmitter arrangement comprises a spatial transmission filter, and wherein the spatial transmission filter comprises a second plurality of spatio-temporal filters, the method comprising:

obtaining a first plurality of arrays, each array comprising digital signals, each digital signal comprising information;

performing first beamforming processing on the first plurality of arrays to obtain a second plurality of processed digital signals;

obtaining filter coefficients for the spatio-temporal filters of the spatial transmission filter in accordance with the filter coefficients for the spatio-temporal filters of the spatial reception filter:

performing second beamforming processing in a time domain on the second plurality of processed digital signals to obtain a third plurality of digital signals, wherein performing the second beamforming processing on the second plurality of processed digital signals comprises spatio-temporally filtering the second plurality of digital signals with the spatio-temporal filters of the spatial transmission filter;

combining each of the third plurality of digital signals with at least one other digital signal of the third plurality of digital signals to obtain a third plurality of combined digital signals, each of the combined digital signals thereby comprising components of at least two of the third plurality of digital signals;

converting each of the third plurality of combined digital signals to a respective analog signal; and transmitting each of the analog signals.

2. The method of claim 1, wherein converting comprises:

converting the third plurality of combined digital signals to a fourth plurality of analog baseband signals; and up-converting each of the fourth plurality of analog baseband signals to a respective carrier frequency radio signal; and wherein transmitting each of the analog signals comprises transmitting each of the carrier frequency radio signals.

3. The method of claim 1, wherein performing first beamforming processing comprises:

pre-coding the first plurality of arrays; and processing the pre-coded arrays in a domain other than the time domain to obtain the second plurality of processed digital signals.

4. The method of claim 3, wherein the domain other than the time domain is a frequency domain, a complex frequency domain, or a wavelet domain.

5. The method of claim 1, wherein none of the third plurality of combined digital signals comprises any component of any signal other than the third plurality of digital signals.

6. The method of claim 5, further comprising:

receiving, by the receiver arrangement, a fifth plurality of analog radio signals;

converting, by the receiver arrangement, the fifth plurality of analog radio signals into a fifth plurality of digital signals;

extracting reference signals from each of the fifth plurality of digital signals;

determining characteristics for each of the fifth plurality of digital signals based on the extracted reference signals; and obtaining the filter coefficients for the spatio-temporal filters of the spatial transmission filter based on the determined characteristics.

7. The method of claim 1, wherein the filter coefficients for the spatio-temporal filters of the spatial transmission filter are obtained or selected so that the spatial transmission filter is a complex conjugate of the spatial reception filter.

8. The method of claim 7, wherein pre-coding is performed on a per sub-carrier basis by a pre-coder having one or more complex valued parameters, wherein the one or more complex valued parameters are obtained based on information about radio signals received by the receiver arrangement.

9. The method of claim 1, wherein the first plurality is equal to the second plurality and wherein the spatio-temporal filters of the spatial transmission filter are multi-tap filters.

10. A multi-antenna transmitter and receiver arrangement, comprising:

a receiver arrangement, the receiver arrangement comprising a spatial reception filter, the spatial reception filter comprising one or more spatio-temporal filters, each spatio-temporal filter having one or more filter coefficients;

a transmitter arrangement comprising a spatial transmission filter, the spatial transmission filter comprising a second plurality of spatio-temporal filters; and controlling circuitry configured to cause:

obtainment of a first plurality of arrays, each array comprising digital signals, each digital signal comprising information;

performance of first beamforming processing on the first plurality of arrays to obtain a second plurality of processed digital signals;

obtainment of filter coefficients for the spatio-temporal filters of the spatial transmission filter in accordance with the filter coefficients for the spatio-temporal filters of the spatial reception filter;

performance of second beamforming processing in a time domain on the second plurality of processed digital signals to obtain a third plurality (N) of digital signals, wherein performance of the second beamforming processing comprises spatio-temporally filtering of the second plurality of digital signals with the spatio-temporal filters of the spatial transmission filter;

combination of each of the third plurality of digital signals with at least one other digital signal of the third plurality of digital signals to obtain a third plurality of combined digital signals, each of the combined digital signals thereby comprising components of at least two of the third plurality of digital signals;

conversion of each of the third plurality of combined digital signals to respective analog signals; and transmission of each of the analog signals.

11. The multi-antenna transmitter and receiver arrangement of claim 10, wherein a transmitter arrangement comprises:

a pre-coder configured to pre-code the first plurality of arrays, a first beamforming processing unit configured to process the first plurality of arrays to obtain the second plurality of processed digital signals, a second beamforming processing unit comprising a second plurality of spatio-temporal filters, wherein the second plurality of spatio-temporal filters are configured to process the second plurality of arrays to obtain the third plurality of digital signals, a filter control unit configured to determine filter coefficients of the second plurality of spatio-temporal filters, a third plurality of combiners configured to combine each of the third plurality of digital signals with at least one other digital signal of the third plurality of digital signals to obtain the third plurality of combined digital signals, a fourth plurality of conversion units configured to convert each of the third plurality of combined digital signals to respective analog signals; and a fourth plurality of transceivers configured to transmit each of the analog signals via a fourth plurality of antenna units.

12. The multi-antenna transmitter and receiver arrangement of claim 11, wherein the receiver arrangement comprises:

a sixth plurality of analog to digital converters configured to convert the fifth plurality of analog radio signals into a fifth plurality of digital signals;

an extraction unit configured to extract reference signals from each of the fifth plurality of digital signals; and a channel analyzer configured to determine characteristics for each of the fifth plurality of digital signals based on the extracted reference signals.

13. The multi-antenna transmitter and receiver arrangement of claim 12, wherein the sixth plurality is the same as the fifth plurality.

14. The multi-antenna transmitter and receiver arrangement of claim 13, further comprising a switch configured to switch the fourth plurality of transceivers between the transmitter arrangement and the receiver arrangement.

15. The multi-antenna transmitter and receiver arrangement of claim 14, wherein the fourth plurality of transceivers is further configured to receive a fifth plurality of analog radio signals via the fourth plurality of antenna units.

16. The multi-antenna transmitter and receiver arrangement of claim 11, comprising a chip, the chip comprising the pre-coder, the first beamforming processing unit, the second beamforming processing unit, the filter control unit and the combiners.

17. The multi-antenna transmitter and receiver arrangement of claim 11, comprising:

a first chip, the first chip comprising the pre-coder, the first beamforming processing unit, and the filter control unit;

a second chip, the second chip comprising the second beamforming processing unit, and the combiners; and a digital interface (DI) configured to interface the first and second chips.

18. A wireless device (WD) comprising the multi-antenna transmitter and receiver arrangement of claim 10.

* * * * *